United States Patent [19]

Paul

[11] Patent Number: 4,464,963
[45] Date of Patent: Aug. 14, 1984

[54] IMPACT-TYPE WIRE ROPE CUTTER WITH FRAGMENT GUARD

[75] Inventor: John R. Paul, Alamo, Calif.

[73] Assignee: Morse-Starrett Products Company, Oakland, Calif.

[21] Appl. No.: 395,689

[22] Filed: Jul. 6, 1982

[51] Int. Cl.³ .................................................. B26D 5/08
[52] U.S. Cl. ........................................ 83/546; 83/545; 83/580; 83/613; 83/DIG. 1
[58] Field of Search ................. 83/545, 546, 639, 580, 83/DIG. 1, 613; 74/612, 615

[56] References Cited

U.S. PATENT DOCUMENTS

| | | | |
|---|---|---|---|
| 1,671,901 | 5/1928 | Ischinger | 74/615 |
| 2,041,386 | 5/1936 | Van Laanen, Jr. | 83/580 |
| 2,140,214 | 12/1938 | Temple, Jr. | 83/639 |
| 2,140,338 | 12/1938 | Temple, Jr. | 83/639 |
| 2,236,833 | 4/1941 | Pell et al. | 83/639 |
| 2,281,366 | 4/1942 | Metcalf | 83/639 |
| 2,384,130 | 9/1945 | Pell et al. | 83/639 |
| 3,246,396 | 4/1966 | Temple et al. | 83/580 |

*Primary Examiner*—Frank T. Yost
*Assistant Examiner*—Hien H. Phan
*Attorney, Agent, or Firm*—Manfred M. Warren; Robert B. Chickering; Glen R. Grunewald

[57] ABSTRACT

An impact-type wire rope cutter is disclosed in which a slotted fragment guard is movably mounted to the body of the wire rope cutter. The slotted fragment guard slidably receives the cutting chisel therethrough, and it is formed so that it can be moved between an open position for receipt of a length of wire rope and a closed position immediately over the cutting area to prevent the direct expulsion or escape of fragments which can be produced by the cutting chisel during cutting. The fragment guard can be retrofit to existing cutters and easily replaced.

7 Claims, 4 Drawing Figures

U.S. Patent  Aug. 14, 1984  4,464,963
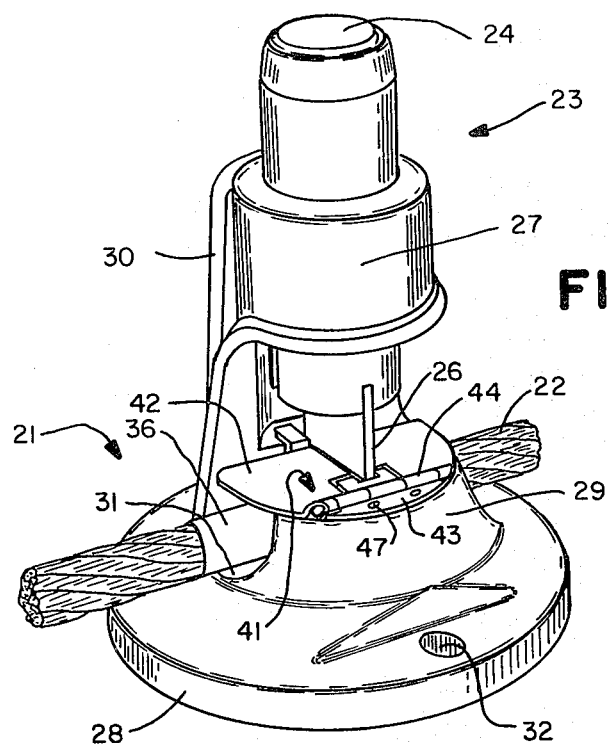
FIG.—1
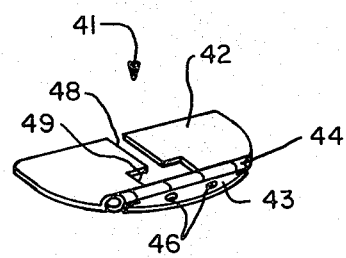
FIG.—4
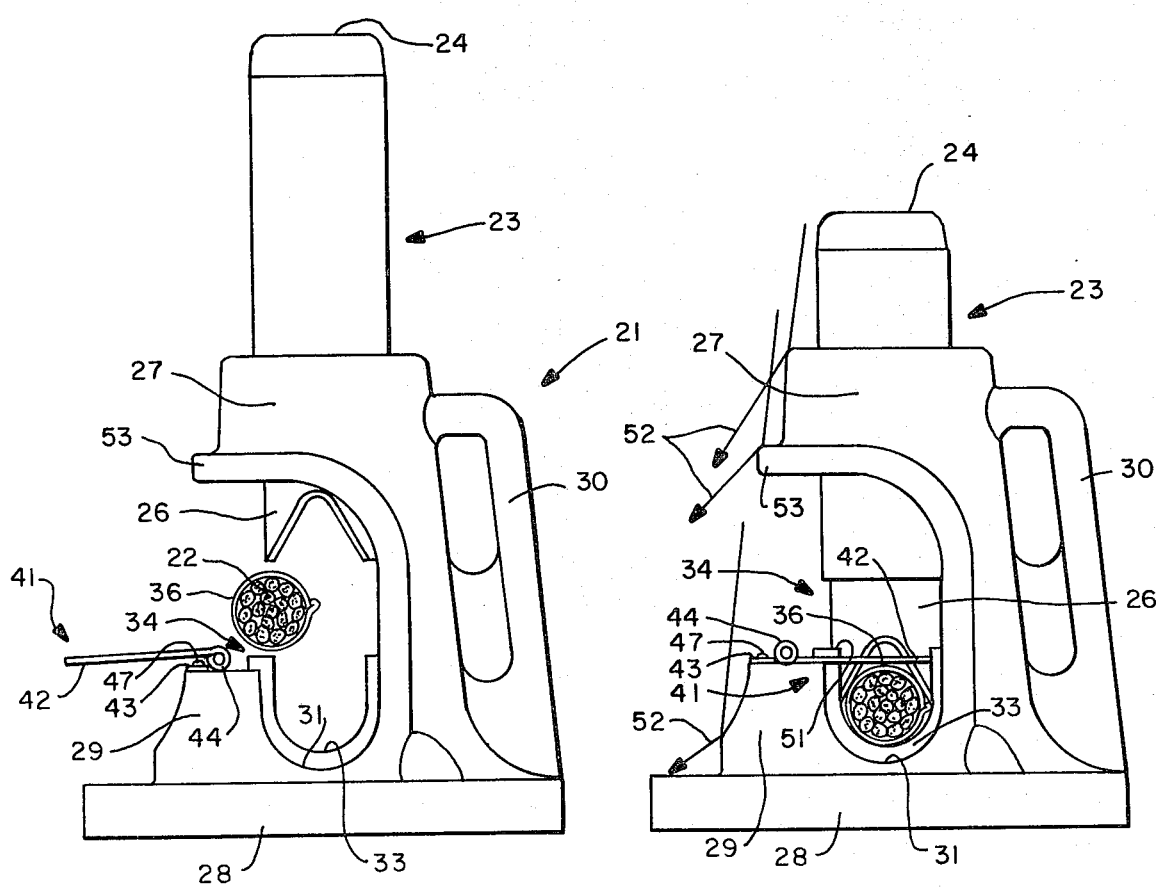
FIG.—2
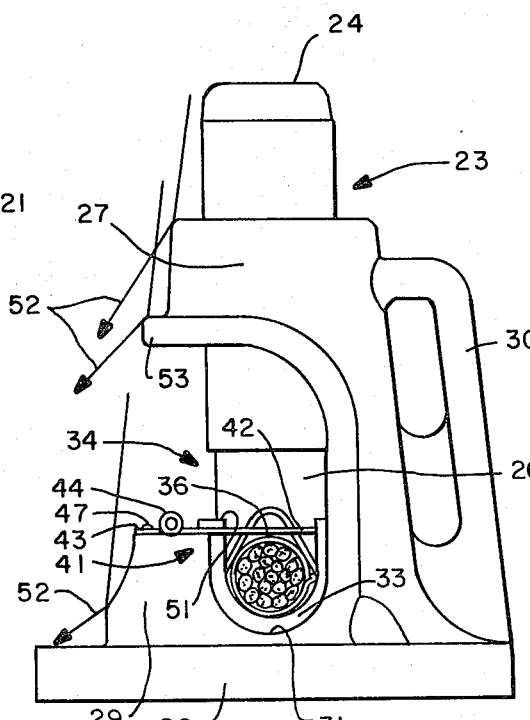
FIG.—3

IMPACT-TYPE WIRE ROPE CUTTER WITH FRAGMENT GUARD

BACKGROUND OF THE INVENTION

For many years high strength wire rope or cable has been cut by impact-type or hammer-action, wire rope cutters. Such cutters are well known in the industry and are particularly advantageous in that they are portable and yet capable of a superior cut on a high-strength cable with only a few blows of a hammer.

Commercially available impact-type wire rope cutters are all generally formed in the same manner. They include a body having a base portion formed for receipt and support of a length of wire rope thereon. Usually a saddle or groove is provided in the base portion and a cutting die is mounted across the saddle or groove. The body extends upwardly to a position over the saddle or groove, and a guide portion is provided in the upper portion of the body and a vertically reciprocatable chisel or cutter is mounted in the guide. The chisel includes an upper end formed with a surface to be struck by a hammer and a lower end which carries a tool steel blade that mates with the die carried in the saddle portion of the base. The wire rope is first wrapped with a cable band (a pliable metallic sleeve) and then positioned in the groove. The chisel is brought down until the blade engages the band, and then using a sledge hammer or the like, the chisel is driven downwardly through the wire rope by impacting the upper end of the chisel.

Such impact-type wire rope cutters have several advantages over hydraulic cutters (hand or power operated) also widely used in industry. Primary among the advantages is the simplicity of construction and attendant lower cost.

Although one should employ a cable band around the section of the wire rope being cut so that any wire fragment produced during cutting will be retained, impact-type wire rope cutters are sometimes used without cable bands. Since these hammer-action, wire rope cutters depend upon a chisel to shear the wire, it is possible for the chisel to rebound off the rope during the cutting process and start a second cut longitudinally displaced on the rope a slight distance from the first cut. The result can be the severing of small wire fragments from the rope. As will be understood, such severing takes place at the time of impact by the chisel cutting blade, and the fragments can fly away or off of the rope at a high enough velocity to be potentially dangerous.

The tendency is for wire fragments to be expelled from or fly off of the wire rope in a near vertical direction along one side of the cutting blade. While proper use of the impact-type wire rope cutter will not produce fragments, and while many fragments which do result will be small, low speed or strike a part of the cutter, occasionally a high speed fragment will be directed upwardly toward the user in a manner which can be dangerous.

OBJECTS OF THE INVENTION

Accordingly, it is an object of the present invention to provide an impact-type wire rope cutter having improved safety and yet great convenience of use.

Another object of the present invention is to provide an impact-type wire rope cutter constructed in a manner to prevent the unimpeded expulsion or flying-off of fragments from the wire rope being cut.

Still a further object of the present invention is to provide a fragment guard for an impact-type wire rope cutter which can be readily retrofit to existing wire rope cutter configurations.

It is a further object of the present invention to provide an impact-type wire rope cutter which is easy to manufacture, easy to operate, durable, has a minimum of moving parts and will not interfere with the cutting action of the cutting blade.

The wire rope cutter of the present invention has other objects and features of advantage which will become apparent from and are set forth in more detail in the accompanying drawing and following description of the preferred embodiment.

SUMMARY OF THE INVENTION

The impact-type wire rope cutter of the present invention includes a body formed for support of a length of wire rope during cutting, and chisel means having an impact surface and a blade portion. The chisel means is movably mounted to the body for displacement of the blade portion into cutting engagement with the wire rope upon impact of the impact surface by an impact tool. The improvement in the wire rope cutter is comprised, briefly, of fragment guard means movably mounted to the cutter for movement between an open position, permitting mounting of the wire rope on the base for cutting, and a closed position at which the guard means is positioned closely proximate and above the wire rope at the area of engagement of the wire rope by the blade portion of the chisel means. The guard means extend sufficiently close around the blade portion and extends a sufficient distance away from the blade portion to prevent unimpeded expulsion of wire fragments from the cutter in the direction of the user during cutting of the rope. In another aspect of the present invention a fragment guard is provided which is suitable for mounting on the body of a wire rope cutter proximate the blade in order to enable retrofitting of existing wire rope cutter apparatus.

DESCRIPTION OF THE DRAWING

FIG. 1 is a top perspective view of a wire rope cutter constructed in accordance with the present invention.

FIG. 2 is a side-elevational view of the cutter of FIG. 1 with the chisel blade in the raised position and the fragment guard in the open position.

FIG. 3 is a side-elevational view corresponding to FIG. 2 with the guard closed and blade in a lowered position.

FIG. 4 is a top perspective view of a fragment guard constructed in accordance with the present invention.

DESCRIPTION OF THE PREFERRED EMBODIMENT

Virtually all impact-type, wire rope cutting apparatus which are being commercially distributed today have the same basic structure as illustrated in the drawing. They include a body, generally designated 21, formed for support of a length of wire rope 22 therein during cutting. Movably mounted to body 21 is chisel means, generally designated 23, which is formed with an impact surface 24 and a blade portion 26. Body 21 is usually C-shaped with an upper portion 27 formed for guided reciprocation of chisel means 23, a base portion or support surface engaging lower platform portion 28, and an upwardly projecting boss 29 which defines a saddle or groove 31 for support of wire rope 22 during cutting. Optionally, the body can include a handle 30 and openings 32 in base 28 to enable the base to be secured to a support surface.

Most conventionally, a slotted die 33 is mounted in saddle 31 and formed for mating receipt of cutting blade 26. As the chisel-like cutting blade 26 moves downwardly, the leading edges thereof are guided in die 33, which cooperates with the cutting blade to effect cutting of the wire rope.

In use, the impact-type wire rope cutter is placed on a near horizontal surface and chisel means 23 lifted to the position shown in FIG. 2. A length of wire rope 22 having a cable band 36 mounted thereon is positioned through the throat area 34 between blade 26 and die 33 until the wire rope rests on the die in saddle 31. Chisel means 23 is then lowered to the position of FIG. 3, and an impact tool, usually a sledge hammer, is used to drive the cutting blade down through the wire rope as supported on cutting die 33.

As thus far described, the impact-type wire rope cutter of the present invention is conventional and well known in the art. In the improved wire rope cutter, however, fragment guard means, generally designated 41, is movably mounted to the cutter for movement of between an open position, shown in FIG. 2, and a closed position, shown in FIGS. 1 and 3. In the open position, guard means 41 permits mounting of the length of wire rope in the saddle and die portion of the base. Thus, in the open position of FIG. 2, fragment guard means 41 is swung out of the way and does not interfere with or diminish the size of throat 34 through which the length of cable is passed.

In the closed position of FIG. 3, fragment guard means 41 is positioned very closely proximate and above the wire rope at the area of engagement of the wire rope by cutting blade 26. Moreover, guard means 41 extends sufficiently close around cutting blade 26 and for a sufficient distance away from blade 26 (along cable 22) to prevent unimpeded expulsion of wire fragments from the cutter in the direction of the user. A fragment which might be produced as a result of the chisel-type blade 26 cannot fly or be projected upwardly along the blade in the direction of the user without impacting the fragment guard. It is possible for a fragment to bounce or rebound at the ends of the cutter along saddle 31, but any such fragment will be moving at very low velocity and in a direction which would not pose any hazard to the user.

In the preferred form, fragment guard means 41 is formed by two members 42 and 43 which are hinged together by horizontally extending hinge means 44. Fragment guard member 43 is formed with openings 46 which permit the guard to be fastened, for example by staking or rivets 47, to upstanding projection or boss 29. Preferably, fragment guard members 42 and 43 have a peripheral shape which conforms generally to the arcuate shape of boss 29 so that they essentially mate therewith. Member 42 will extend on either side of blade 26 by a distance at least about equal to one diameter of the maximum wire rope to be cut in the wire rope cutter.

As best may be seen in FIG. 4, the pivotal fragment guard member 42 is preferably formed with a slot 48 dimensioned for sliding receipt of blade 26 so that fragments cannot come up between guard member 42 and the cutting blade. Additionally, slot 48 is enlarged at 49 so as to accommodate guide and cutting die 33. As best may be seen in FIG. 3, the upper ends 51 of die 33 project above fragment guard member 42 so that blade 26 is guided by die 33 down through slot 48 in the fragment guard.

It is a further feature of the wire rope cutter and the fragment guard of the present invention that the fragment guard be positioned beneath a portion of guide means 27 for chisel 23. As will be seen from arrows 52 in FIG. 3, it is not uncommon for the user to miss impact surface 24 with the sledge hammer. This will result in impacting of the base or guide means 27 with the hammer, and the hammer will be deflected as indicated by arrows 52 away from the cutting apparatus. Because of the overhang of guide means 27, and particularly lip 53 and the superimposition of fragment guard 41 under lip 53, it is relatively difficult to strike the fragment guard or hinge 44 thereof with the hammer during normal use of the wire cutting device. Thus, the guard is hingedly secured to base 21 in a position or location which is at least partially shielded from impact by the hammer used to effect cutting of the wire rope.

The fragment guard of the present invention can be readily retrofit to existing wire rope cutters. Thus, it is a simple matter to drill bores in the upper surface of boss 29 and then stake, rivot or otherwise fasten fragment guard 41 to the base. One need not, therefore, sacrifice safety in the interests of costs. The fragment guard of the present invention is relatively inexpensive to produce and to incorporate as original equipment or add to an existing wire rope cutter. Plates 42 and 43 can be easily stamped from various metals but are most advantageously formed of a steel, and the fragment guard can be easily replaced in the event that it is inadvertently struck by the sledge hammer.

What is claimed is:

1. An impact-type wire rope cutter including a body formed for support of a length of wire rope during cutting, and chisel means having an impact surface and a blade portion and movably mounted to said body for displacement of said blade portion into cutting engagement with said wire rope upon impact of said impact surface by an impact tool, wherein the improvement in said wire rope cutter is comprised of:
   fragment guard means mounted to said cutter for movement while coupled to said cutter between an open position permitting mounting of said wire rope on said body for cutting and a closed position at which said guard means is positioned closely proximate and above said wire rope, said guard means being formed to define slot means dimensioned for receipt and downward displacement of said blade portion through said slot means to enable cutting of said wire rope with said guard means in said closed position without damage to said guard means, and said guard means in said closed position extending sufficiently close around said blade portion and extending a sufficient distance away from said slot means receiving said blade portion to prevent unimpeded expulsion of wire fragments from said wire rope cutter in an upward direction during cutting of said wire rope.

2. The impact-type wire rope cutter as defined in claim 1 wherein,
   said guard means is mounted to said body and in said closed position extends along said wire rope on both sides of said blade portion a distance equal to at least one diameter of the wire rope to be cut.

3. The impact-type wire rope cutter as defined in claim 1 wherein,
said guard means is mounted to said body for pivotal movement between said open position and said closed position and said slot means is dimensioned for sliding receipt of said blade portion therethrough.

4. The impact-type wire rope cutter as defined in claim 1 wherein,
said guard means is hingedly secured to said body at a location shielded from impact by said impact tool during normal use of said wire rope cutter.

5. The impact-type wire rope cutter as defined in claim 1, and said body is formed as a C-shaped member having an upper portion thereof formed for guided reciprocation of said chisel means therein and a lower portion thereof carrying die means and being formed with a cable supporting groove, said body being further formed for insertion of said wire rope into said groove through a throat between said upper portion and said lower portion of said body, and wherein the further improvement in said wire rope cutter comprises:
said guard means being formed by a slotted plate hingedly secured to said lower portion and movable to an open position permitting insertion of said wire rope through said throat and to a closed position extending across the top of said wire rope as mounted in said groove, said slot being dimensioned for sliding receipt of said blade portion of said chisel means therein.

6. The impact-type wire cutter as defined in claim 1, and said body includes die means formed for mating receipt of said blade portion of said chisel means, and wherein the further improvement comprises:
said guard means being formed and mounted for movement to a closed position at which said die means extends upwardly above said guard means for guided engagement of said blade portion of said chisel means prior to passing beyond said guard means.

7. A fragment guard formed for mounting to an impact-type wire rope cutter having a cutter body formed for support of a length of wire rope during cutting, and chisel means having a blade portion and movably mounted to said body for displacement of said blade portion into cutting engagement with a wire rope comprising:
a guard body formed for mounting to said cutter body and having a movable portion mounted for movement while coupled to said body between an open position permitting mounted of said wire rope on said base and a closed position at which said guard means is positioned closely proximate and above said wire rope, said movable portion being formed for extension of said chisel means through said movable portion when in said closed position for downward displacement of said chisel means with respect to said movable portion during cutting while said movable portion is in said closed position, and said movable portion being further formed to extend sufficiently close.around said blade portion and extending a sufficient distance away from said blade portion to prevent unimpeded flying-off of wire fragments from said wire rope cuttter in an upward direction during cutting of said wire rope.

* * * * *